(12) United States Patent
Van Haecke

(10) Patent No.: US 12,305,609 B2
(45) Date of Patent: May 20, 2025

(54) HIGH-MASS HYDRO ROTOR FOR HYDROELECTRIC POWER GENERATION

(71) Applicant: Leonard Van Haecke, Silver Lake, WI (US)

(72) Inventor: Leonard Van Haecke, Silver Lake, WI (US)

( * ) Notice: Subject to any disclaimer, the term of this patent is extended or adjusted under 35 U.S.C. 154(b) by 0 days.

(21) Appl. No.: 18/623,200

(22) Filed: Apr. 1, 2024

(65) Prior Publication Data
US 2024/0240607 A1   Jul. 18, 2024

Related U.S. Application Data

(63) Continuation-in-part of application No. 17/942,964, filed on Sep. 12, 2022, now Pat. No. 11,946,457.

(51) Int. Cl.
*F03B 17/06* (2006.01)
*H02K 7/18* (2006.01)

(52) U.S. Cl.
CPC ......... *F03B 17/067* (2013.01); *H02K 7/1823* (2013.01); *F05B 2220/706* (2013.01)

(58) Field of Classification Search
CPC ................. F03B 17/067; H02K 7/1823; F05B 2220/706
See application file for complete search history.

(56) References Cited

U.S. PATENT DOCUMENTS

| | | | |
|---|---|---|---|
| 4,241,283 A | 12/1980 | Storer, Sr. | |
| 5,503,597 A | 4/1996 | Lochtefeld et al. | |
| 7,758,435 B2 | 7/2010 | Henry et al. | |
| 7,918,087 B1 | 4/2011 | Brown et al. | |
| 8,516,812 B2 | 8/2013 | Manakkaltupadeettathil | |
| 10,309,368 B2 | 6/2019 | Hashimoto | |
| 10,927,807 B1* | 2/2021 | Bidgood | B63B 35/44 |
| 2011/0080002 A1 | 4/2011 | Santana | |

(Continued)

FOREIGN PATENT DOCUMENTS

| CN | 205532999 U | 8/2016 |
|---|---|---|
| CN | 110552834 A | 12/2019 |

(Continued)

OTHER PUBLICATIONS

Vougioukli;Financial Appraisal of Small Hydro-Power Considering the Cradle-to-Grave Environmental Cost: A Case from Greece; Energies 2017,10,430; doi:10.3390/en10040430 (20).

(Continued)

*Primary Examiner* — Viet P Nguyen
(74) *Attorney, Agent, or Firm* — RYAN KROMHOLZ & MANION, S.C.

(57) ABSTRACT

A run-of-the-river hydroelectric generating plant is disclosed, in which river water is diverted downstream, used in the hydroelectric generation process, and sent back to the river. A high-mass, large diameter hydro rotor for hydroelectric power generation is disclosed. A large diameter circular horizontal water flow, the desired water flow regime, is created to float and rotate the high-mass hydro rotor, which is coupled to a turbine shaft. Extremely high torque and angular momentum is provided for conversion into extremely high energy output. The desired water flow regime can be augmented with different configurations of penstocks, intake channels, and discharge channels.

9 Claims, 9 Drawing Sheets

(56) References Cited

U.S. PATENT DOCUMENTS

2018/0258903 A1    9/2018  Guala et al.
2021/0332784 A1   10/2021  Shimizu
2022/0250723 A1*  8/2022  Hutcheson .............. B63B 21/50
2022/0316441 A1* 10/2022  Kay ..................... F03B 17/065

FOREIGN PATENT DOCUMENTS

| | | |
|---|---|---|
| CN | 214424623 U | 10/2021 |
| CN | 215370094 U | 12/2021 |
| CN | 216642329 U | 5/2022 |
| CN | 112709663 B | 7/2022 |
| CZ | 2057 U1 | 8/1994 |
| CZ | 16778 U1 | 8/2006 |
| GB | 2483270 A | 3/2012 |
| GB | 2581622 | 8/2020 |
| GB | 2590799 A | 7/2021 |
| WO | WO 2010/048962 A3 | 5/2010 |
| WO | WO 2017/056004 A1 | 4/2017 |
| WO | WO 2018/066915 A1 | 4/2018 |

OTHER PUBLICATIONS

Author unknown; Vertical Axis Wind Turbine, Design Concept, Wind energy Harvesting for Storage and power generation. Date unknown.

* cited by examiner

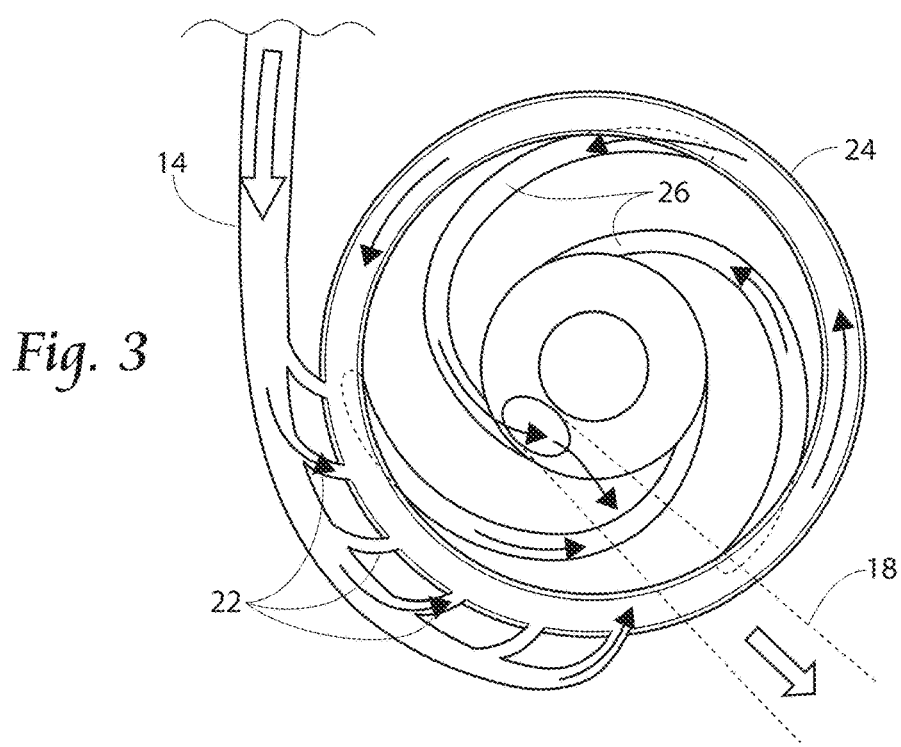
Fig. 3
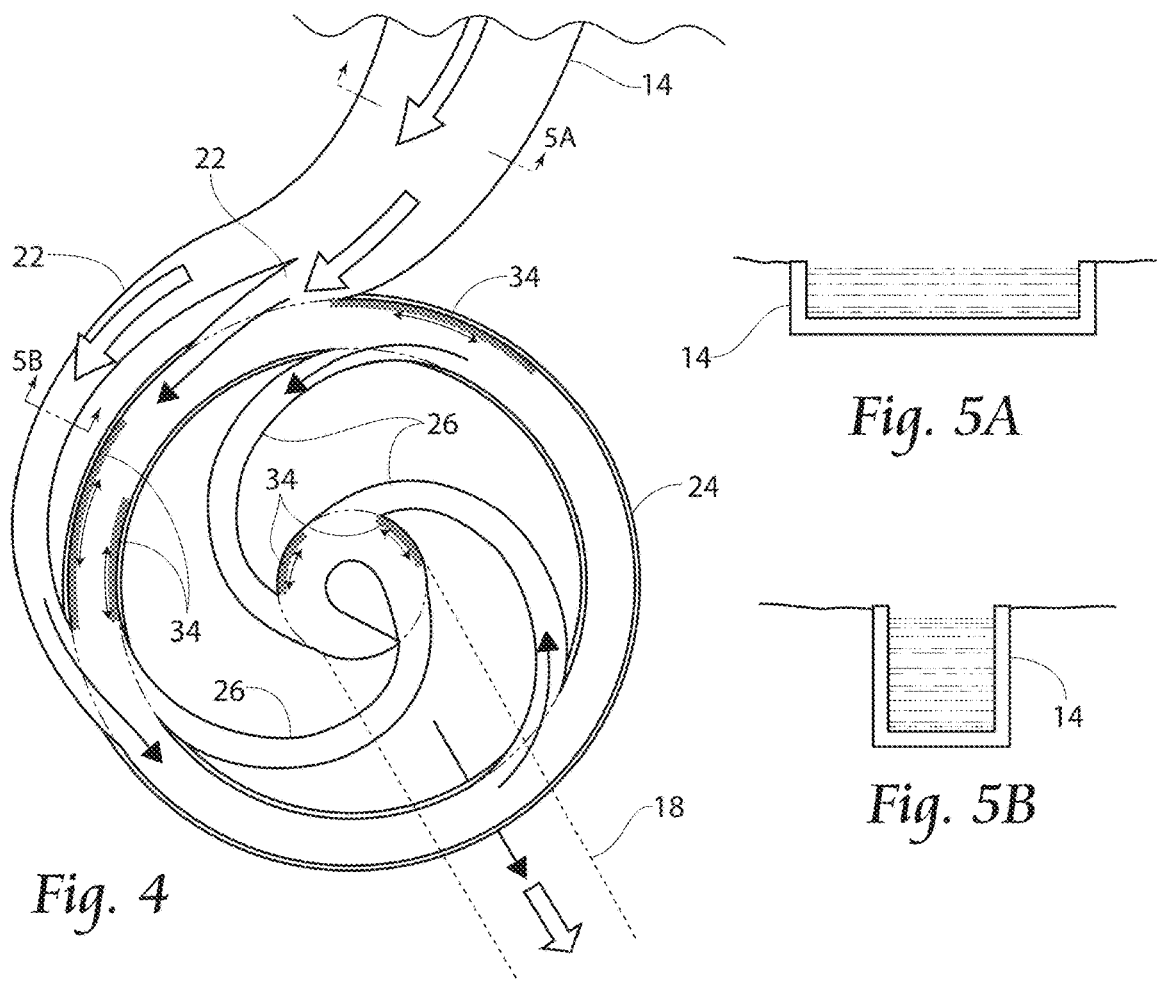
Fig. 4
Fig. 5A
Fig. 5B

HIGH-MASS HYDRO ROTOR FOR HYDROELECTRIC POWER GENERATION

CROSS-REFERENCE TO RELATED APPLICATIONS

This application is a continuation-in-part of patent application Ser. No. 17/942,964, filed 12 Sep. 2022 (now U.S. Pat. No. 11,946,457).

BACKGROUND OF THE INVENTION

Large scale environmentally friendly renewable resources are the energy production mode of the future. For this purpose, wind turbines are commonly used. A wind turbine is a pole mounted vertical flywheel that is difficult to build on a large scale. Large scale models in present use include a wind turbine known as the GE Haliade-X offshore wind turbine with a rotor diameter of 220 Meters and a blade circumference of 0.43 miles. One of the most efficient wind turbines currently available is known as the Vestas V164 with a rotor diameter of 164 meters and a circumference of 0.32 miles. Power output of wind turbines is controlled by wind speed, air density, and blade radius. The largest wind turbines are reserved for ocean placement, and land based wind turbines are much smaller and accordingly produce less electricity due to the smaller blade radius.

Another renewable resource is hydroelectric energy, which takes advantage of the hydraulic head of downhill flowing water to rotate a shaft in an electric generator, the shaft carrying a component which passes a stator to produce electricity. The generator is coupled to a transformer and ultimately to power transmission cables connected to users.

There are two main types of hydropower: impoundment and run-of-river. Impoundment hydropower requires a dam on the river, which has many known detrimental environmental side effects.

Run-of-the-river hydroelectricity is a type of hydroelectric generation that does not require building a dam. One example of run-of-the-river hydroelectricity is where a portion of the river flow is diverted through a pipe or tunnel, and sent to a hydroelectric generation plant, and then returned to the main river flow.

There is a long history of hydroelectric power generation of many types. In some instances of run-of-the-river hydroelectric generation, such as U.S. Pat. No. 10,309,368 machines or engines use liquid flow with predominantly kinetic energy conversion, e.g. of swinging-flap type, "run-of-river", "ultra-low head" are used. These structures have a rotation axis substantially at right angles to flow direction, with the flow engaging parts having a cyclic movement relative to the rotor during its rotation. Swinging gates are often used so that upstream blocking plates are oriented horizontally and not subjected to downstream flow. Gates swing downwardly to a vertical orientation so that downstream flow impacts the rear of the gate and rotates the rotating body. Swinging gates are used because if the rotating body is subjected to upstream flow on one side and downstream flow on the other, the forces cancel out and the body will not rotate.

In another example disclosed in U.S. Pat. No. 10,502,178, the upstream-traveling blades of the rotating body are taken out of the river, and out of contact with downstream river flow so that only the downstream river flow impacts the blades, which are used to rotate the rotating body.

Flow blockers are also used to prevent flow from hitting the upstream-traveling blades on the rotating body. Floating devices, such as stationary floating vertically oriented water wheels are also used. A series of vertically oriented water wheels are disclosed in U.S. Pat. No. 4,241,283.

Existing run-of-the-river hydroelectric plants are very effective and have massive outputs for their size. One of the oldest run-of-the-river plants in use today is the Saint Mary's Falls Hydropower plant in Sault Ste. Marie, MI which generates 18MW, completed in 1902. Most run-of-the-river power plants that are in use today take advantage of high water drops such as water falls to use a higher hydraulic head and thus generate more electricity.

The main disadvantage of run-of-the-river power plants is that many rivers are relatively flat and therefore a high hydraulic head is not immediately present.

SUMMARY OF THE INVENTION

A run-of-the-river hydroelectric generating plant is disclosed. River water is diverted downstream, used in the hydroelectric generation process, and sent back to the river downstream. A high-mass, large diameter hydro rotor for hydroelectric power generation is disclosed. A large diameter circular horizontal water flow, the desired water flow regime, is created to rotate the high-mass hydro rotor, which is coupled to a turbine shaft. Extremely high torque and angular momentum is provided for conversion into extremely high energy output. The desired water flow regime can be augmented with different configurations of penstocks, intake channels, and discharge channels.

Main components of the system include a penstock/canal arrangement for directing water flow, the high-mass hydro-rotor which is preferably a series of barge-like floating objects spun by the flowing water in the canal for converting the flowing water energy to low speed rotational energy, and the generator which includes the electrical generator, the control electronics, a gearbox (preferably planetary), and an adjustable-speed drive, or continuously variable transmission to convert the low-speed rotation to high-speed rotation suitable for generating electricity.

The penstock/canal driven hydro-rotor can take advantage of both low and high water drops. A run-of-the-river high-mass hydro rotor can be used in places with low water drops, preferably accompanied by high flow rates that can be used to obtain significant electrical output due to the large diameter and mass of the hydro-rotor.

In addition to penstock/canal driven, the high-mass hydro rotor can be wind driven as well, or a combination of both penstock/canal and wind driven to increase hydro-rotor rotational speed to increase electrical output. In addition, the hydro-rotor can carry a separate vertical axis wind turbine (VAWT) to augment energy production using the same footprint as the hydro-rotor.

Benefits of the present invention include an environmentally friendly renewable energy source that generates energy on a per acre basis comparable to or exceeding nuclear and wind energy.

Although the invention is described as a run-of-the-river hydroelectric generating plant, an impoundment type hydroelectric generating plant could also achieve the desired water flow regime.

BRIEF DESCRIPTION OF DRAWINGS

FIG. 3 is a first variation of a hydroelectric generation system flow regime;

FIG. 4 is a second variation of a hydroelectric generation system flow regime with a varied penstock and tailrace arrangement and central hub vortex output;

FIG. 5A is a section view of a wide and shallow penstock portion;

FIG. 5B is a section view of a narrow and deep intake channel portion;

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The invention described herein may refer to the terms "rotor" or "hydro-rotor." In using these terms, the inventor does not seek to limit these terms to have a meaning limited to a rotor/stator combination as used in reference to motors. Instead, the terms rotor or hydro-rotor are intended to be broadly construed as a rotating body. Similar broad usage of "rotor" is common when referring to blades of a windmill.

Figure 1:
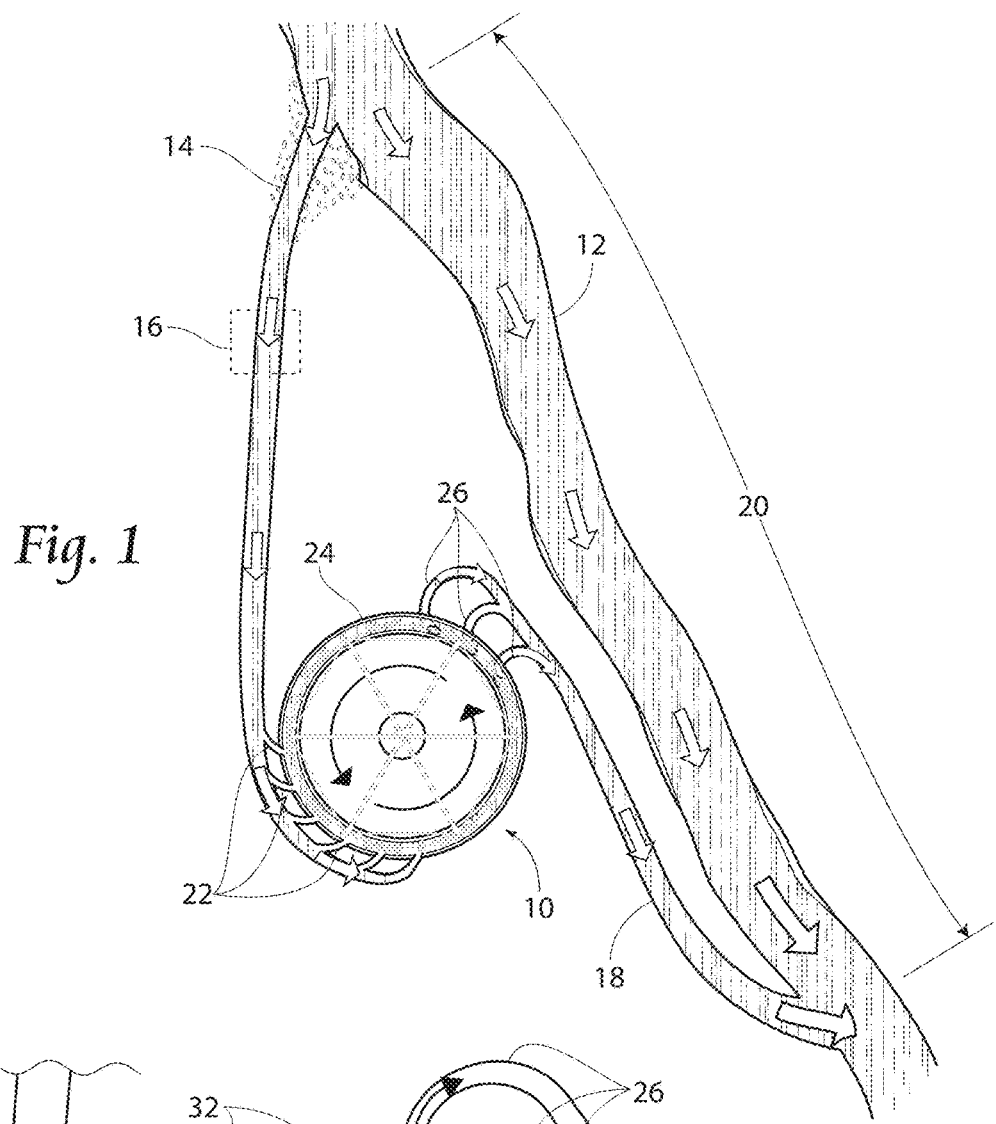
FIG. 1 is top schematic plan view of a hydroelectric generation system of the present invention.

Referring now to FIG. 1, a top schematic plan view of a hydroelectric generation system 10 of the present invention is shown. Once aspect of the present invention is to create a water flow regime to support rotation of a high-mass hydro rotor. A flowing river 12 is diverted into an upstream canal, tube, or penstock 14. Gates (not shown) can be used to block objects such as floating debris and ice from entering the hydroelectric generation system 10. Optionally, a settling basin 16 is provided to settle out sediment carried by the river 12 before the river flow enters the hydroelectric generation system 10 to limit the exposure to sediment.

Water flows through penstock 14 into a hydroelectric generation system intake channel or channels 26. Water then flows rotationally through rotor channel 24, which is preferably horizontal and circular, although other rotor channel 24 configurations are possible. After flowing rotationally through rotor channel 24, water exits the rotor channel 24 through a discharge channel or channels 26, through a tailrace 18, and rejoins river 12. In the illustrated embodiment, water would flow through rotor channel counter-clockwise.

Diversion reach 20 is a distance from where the water first entered the intake 14 upstream to where the water is returned to the river 12. The diversion reach can vary depending on site conditions or desired flow characteristics.

In a preferred embodiment, a plurality of intake channels 22 are provided angularly spaced apart about a periphery of rotor channel 24, on either an inner or outer wall, or bottom of rotor channel 24, or any combination of those positions. Intake channels 22 act as jets pointed in the intended downstream direction, that pass water into the rotor channel 24 to drive the direction of flowing water, in the illustrated embodiment counter-clockwise. Similarly, a plurality of discharge channels 26 are provided spaced apart about a periphery of an inner or outer wall, or bottom of rotor channel 24, or any combination of these positions. At present it is believed that a preferred embodiment would be intake channels 22 provided toward the vertical top of rotor channel 24 aimed to encourage circular water flow in rotor channel 24, and discharge channels 26 provided toward the vertical bottom of rotor channel 24 aimed with an axis initially parallel to the vector of downstream water flow. The exact number and positioning of intake channels 22 and discharge channels 26 can be varied, both vertically in regards to the rotor channel 24 and peripherally about the rotor channel 24.

Figure 2:
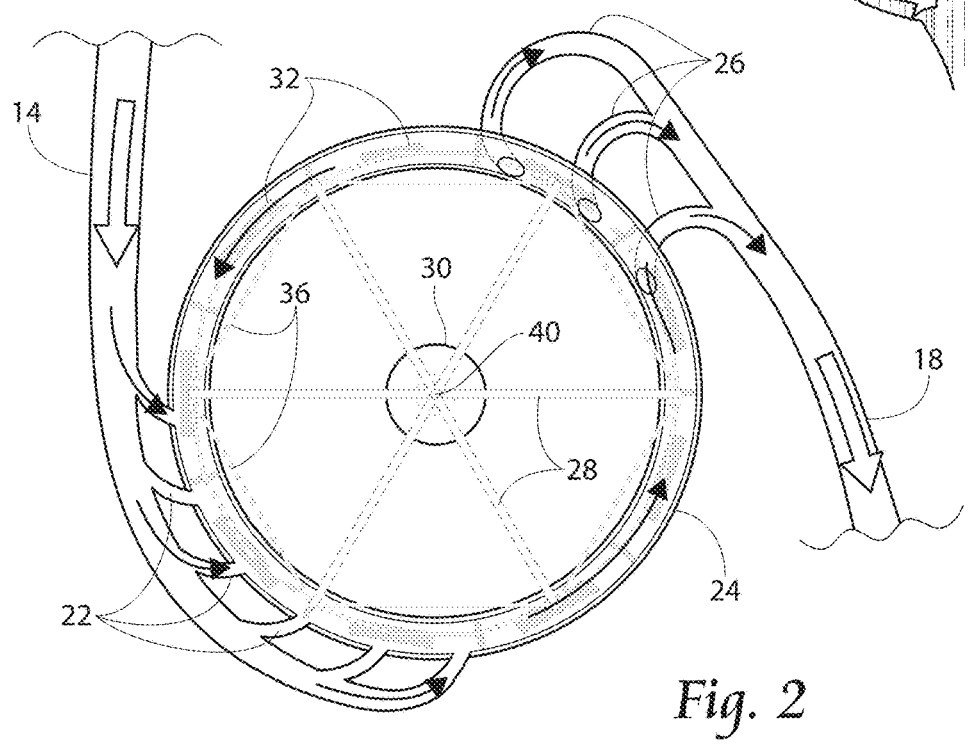
FIG. 2 is an enlarged view of the hydroelectric generation system penstock/intake channel/discharge channel arrangement showing components of hydroelectric power generation.

Referring now to FIG. 2, an enlarged view of the hydroelectric generation system 10 with the water flow regime established and described with reference to FIG. 1 is shown. In FIG. 2, discharge channels 26 are provided on the vertical bottom of rotor channel 24.

One or more barges 32 are positioned within discharge channel 24. Barges 32 are preferably coupled to one another by struts 36 to create a train of barges 24 train that will travel with the direction of water flow (rotating or spinning counterclockwise as shown). The train of barges 24 acts as a high-mass rotor connected by spokes 28 to a central turbine shaft 40 which acts upon turbine/generator 30 to create electricity by converting the flowing water energy to low speed rotational energy. One or more barges 24 of the train of barges 24 acts as rotor that connects to the turbine/generator, either directly (as in the case of a direct drive turbine) or through a shaft and a series of gears (a gearbox) that speed up rotation during electricity generation.

Turbine/generator 30 includes the required components to generate energy, including the electrical generator, the control electronics, a gearbox (preferably planetary), and an adjustable-speed drive, or continuously variable transmission to convert the low-speed rotation to high-speed rotation suitable for generating electricity. The details of turbine/generator 30 are not shown but known in the art, and in this sense can share power generation technology with large scale windmills.

In a preferred embodiment, the radius of rotor channel 24 is very large. The rotor channel can be ⅓-½ mile long or longer. The depth of the rotor channel 24 can be 50 feet or wider, and 30 feet or deeper. Radius and depth of rotor channel 24 can of course be larger or smaller than this.

Referring specifically to barges 32, the barges 32 can be loaded as desired to maintain buoyancy, yet still create a high mass effect on energy production. In the United States, common barges 32 can be, for instance 195 feet long by 35 feet wide, with a 12 foot hull, and can hold up to 1500 tons of ballast material. Barges 32 of these dimensions can carry up to one million gallons of liquid product, and have a dead weight of approximately 300 to 600 tons each. Barges 32 of different dimensions and carrying capacity can be used.

In an exemplary embodiment, water 15 feet deep in rotor channel might rise to 25 feet deep once barges 32 (with or without ballast) are introduced. Typical river flow speed is between 0-7 miles per hour. Diversion of a large amount of water from river 12 will cause, in an exemplary system, 6,000+ cubic feet per second water diversion to get obtain water running 5 mph through a 50' wide by 17' deep rotor channel 24.

Barges 32, preferably floating, travel carried by the current created in rotor channel 24.

Because of the very large scale of the rotor channel 24 and the barges 32, very large inertia is created when barges 32 are transported by the circular water flow. For a point-like object, rotational inertia=$I=mr2$, where m is mass and r is the radius between the object and the axis, it is evident that a large mass rotating about a large radius will develop very large rotational inertia. Regarding the present invention, it is simplified to consider that a thin hoop of radius r and mass m would have a thin hoop moment of inertia, accounting for the upward buoyant forces acting on barges 32 in accordance with Archimedes' principle. Calculating further, the rotational energy, or E, is calculated by the equation $E=½(Iω2)$, where I=inertia, ω=angular velocity. Angular momentum is also considered.

Suffice it to say, with respect to the present invention, a more massive object(s), traveling at a greater rotational speed, at a greater radius, will produce far greater energy. Therefore, within the constraint of the provided river water flow volume, it is desired to rotate heavier barges 32 at a larger radius rotor channel 24 to increase energy output.

Referring now to FIG. 3, a first variation of a hydroelectric generation system 10 flow regime defined by penstock/intake channel 14 and discharge channel 26 arrangement is shown. In the illustrated embodiment, three discharge channels 26 are positioned (more or less can be used in practice) at the vertical bottom of rotor channel 24, aimed to receive, with an axis initially parallel to the vector of downstream water flow, water egressing from rotor channel 24. Discharge channels 26 of this embodiment are spirally and downwardly led to a deep center relative to rotor channel 24, which is coupled with the outtake to tailrace 18. This arrangement is intended to encourage a vortex effect in which the flow within rotor channel 24 accelerates to the outtake of tailrace 18, which is positioned underneath the discharge channels 26 and rotor channel 24.

Referring now to FIG. 4, a second variation of a hydroelectric generation system 10 flow regime with a varied penstock 14 and discharge channel 26 arrangement is shown. Greater flow speeds in rotor channel 24 are preferred, and can be created by higher water flow, or by the hydraulic characteristics of an upstream wider shallower intake penstock 14 (see FIG. 5A) transitioning to narrower and deeper intake channel 22 (see FIG. 5B) on approach to water discharge to rotor channel 24. Due to the constriction of flow between the upstream wider shallower intake penstock 14 the narrower and deeper intake channel 22 on approach to rotor channel 24, speed of the water entering rotor channel 24 increases, encouraging faster flow speed in rotor channel 24. As with FIG. 3, the discharge channels 26 are preferably arranged to encourage a vortex-like effect. Additionally, a series of sliding gates 34 can be provided to control the flow of water as needed for optimum performance.

Figure 6:
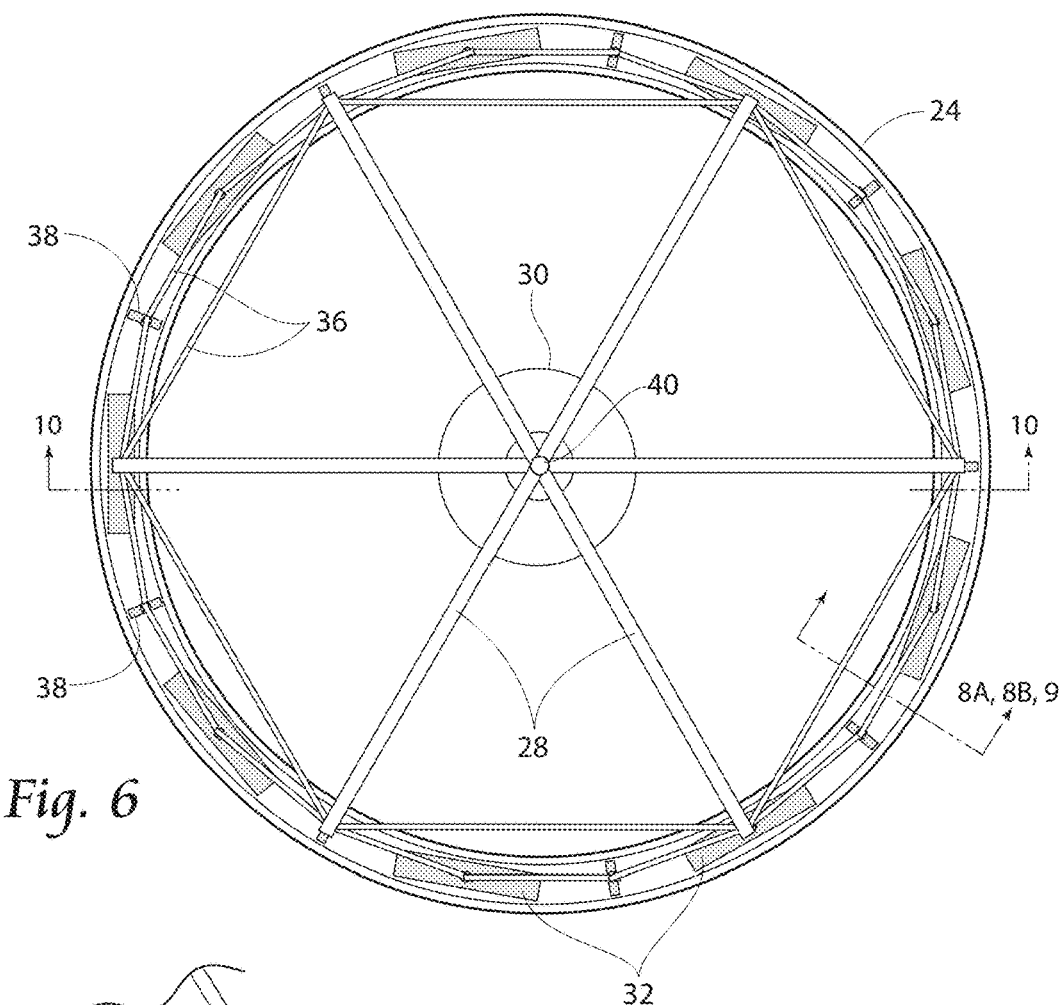
FIG. 6 is a top view of a high-mass hydro rotor rotating structure carrying rotating barges.
Figure 7:
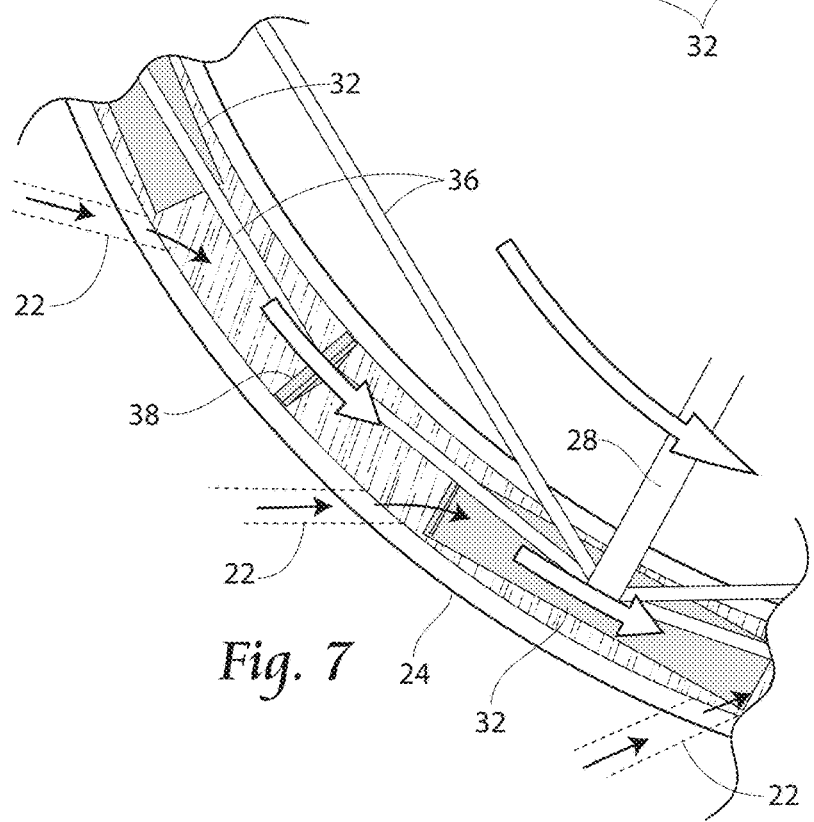
FIG. 7 is an enlarged view of the high-mass hydro rotor rotating structure carrying rotating barges.

Referring now to FIG. 6, a top view of the high-mass hydro rotor rotating structure carrying rotating barges 32 is shown. In this embodiment, pivoting flaps 38 are positioned between barges 32. Pivoting flaps 38 can be deployed vertically to catch more water to additionally encourage rotation of barges 32. Referring now to FIG. 7, intake channels 22 direct incoming water to impact the rear of barges 32 and pivoting flaps 38.

Figure 8A:
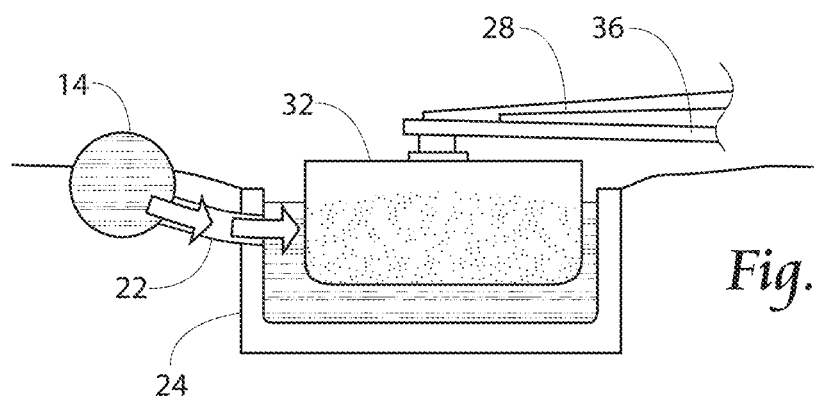
FIG. 8A is a cross-sectional view of an input penstock and high-mass hydro rotor rotating structure carrying a rotating barge.
Figure 8B:
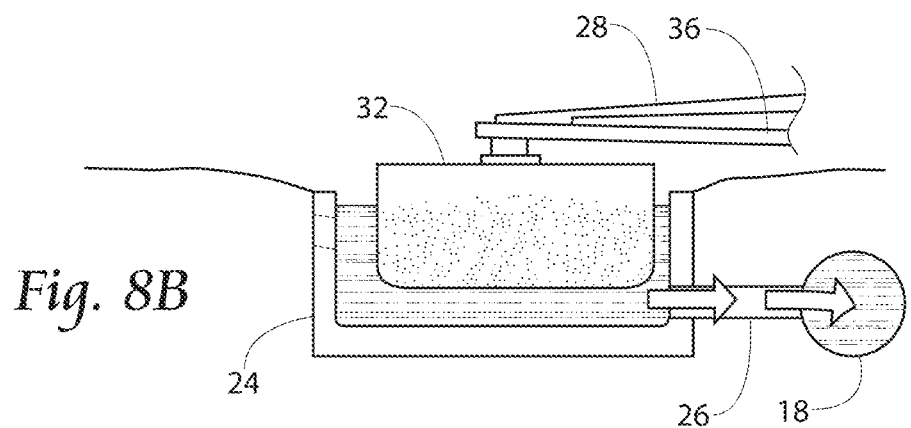
FIG. 8B is a cross-sectional view of an embodiment of a discharge penstock and high-mass hydro rotor rotating structure carrying a rotating barge.

Referring now to FIGS. 8A and 8B, cross-sectional views of an input penstock 14 and intake channel 22 is shown (FIG. 8A), and a discharge channel 26 and tailrace 18 is shown (FIG. 8B). In the illustrated embodiments, the intake channels 22 are positioned vertically high on the wall of the rotor channel 24, and the discharge channel 26 is positioned vertically low. In the illustrated embodiment, the rotor channel 24 has a rectangular cross-section and carries a rectangular cross-section shaped barge 32. Of course, other cross-sectional shapes of both the rotor channel 24 and the barge 32 are possible, such as semi-circular in cross-section. Additionally, barges 32 can be provided with scale-like features to allow the barges 32 to be impacted by more water. At any rate, in a preferred embodiment, the cross-sectional shapes of both the rotor channel 24 and the barge 32 are complimentary.

Figure 9:
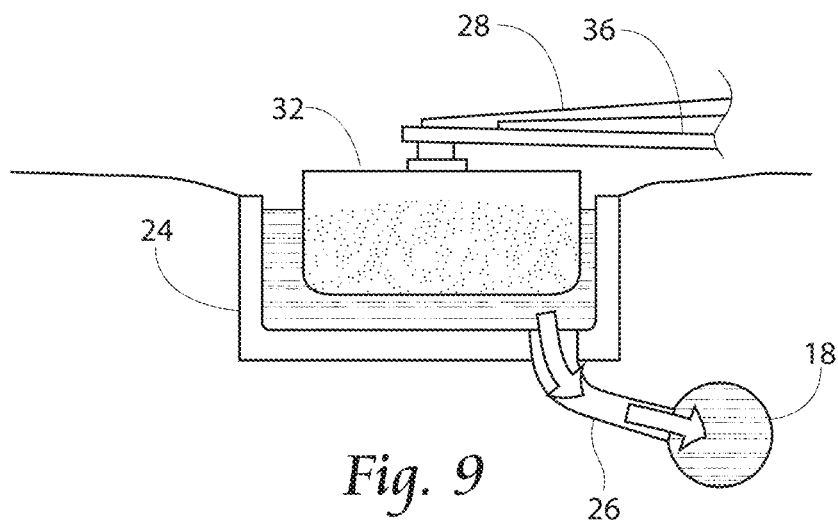
FIG. 9 is a cross-sectional view of an embodiment of a discharge penstock and high-mass hydro rotor rotating structure carrying a rotating barge.

Referring now to FIG. 9, a cross-sectional view of discharge channel 26 and high-mass hydro rotor rotating structure carrying a rotating barge 32 is shown. In this embodiment, discharge channel 26 has a downward vertical trajectory.

Figure 10:
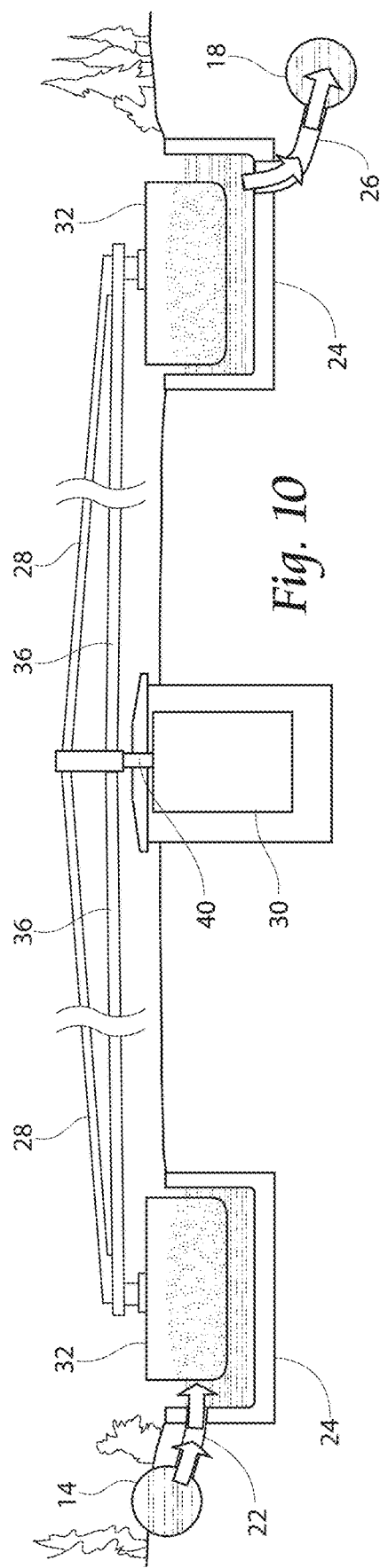
FIG. 10 is an overall cross-sectional view of the first variation flow regime carrying rotating barges.

Referring now to FIG. 10, an overall cross-sectional view of a flow regime carrying rotating barges 32 is shown. In this embodiment, intake channels 22 and discharge channels 26 are positioned as shown in FIG. 2.

Figure 11:
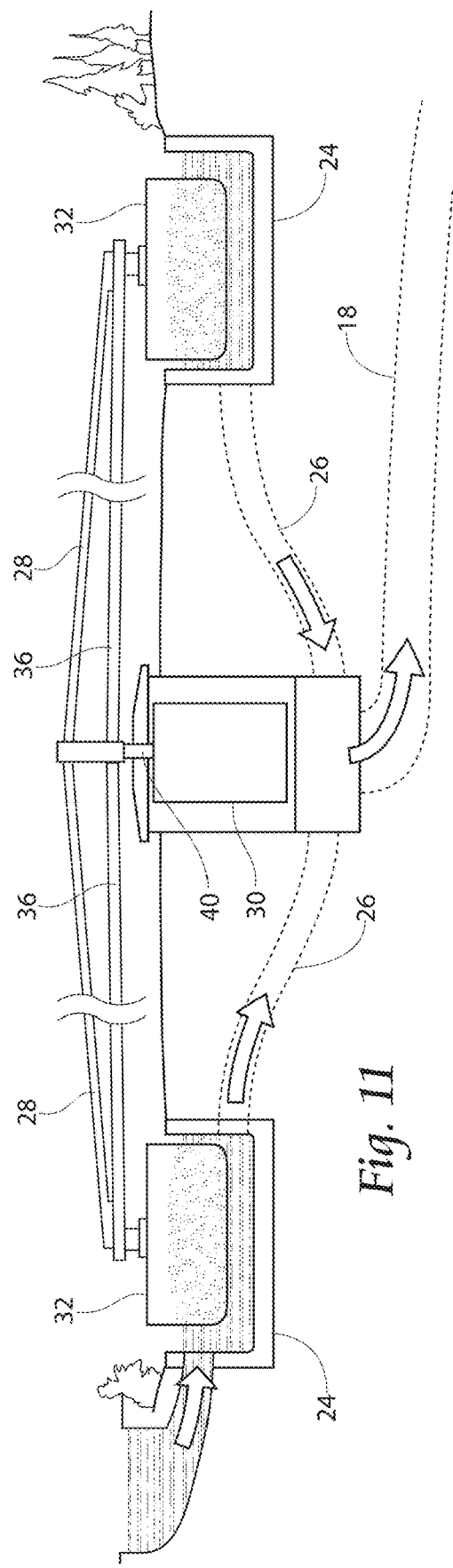
FIG. 11 is an overall cross-sectional view of a second variation flow regime carrying rotating barges.

Referring now to FIG. 11, an overall cross-sectional view of another flow regime carrying rotating barges. In the illustrated embodiment, discharge channels 26 are oriented inwardly to centralize flow to tailrace 18, and to encourage flow as explained in reference to FIGS. 3 and 4. In FIG. 11, the optional impoundment system is used to introduce water into the rotor channel, instead of penstock 14/intake channel 22 configurations.

Figure 12:
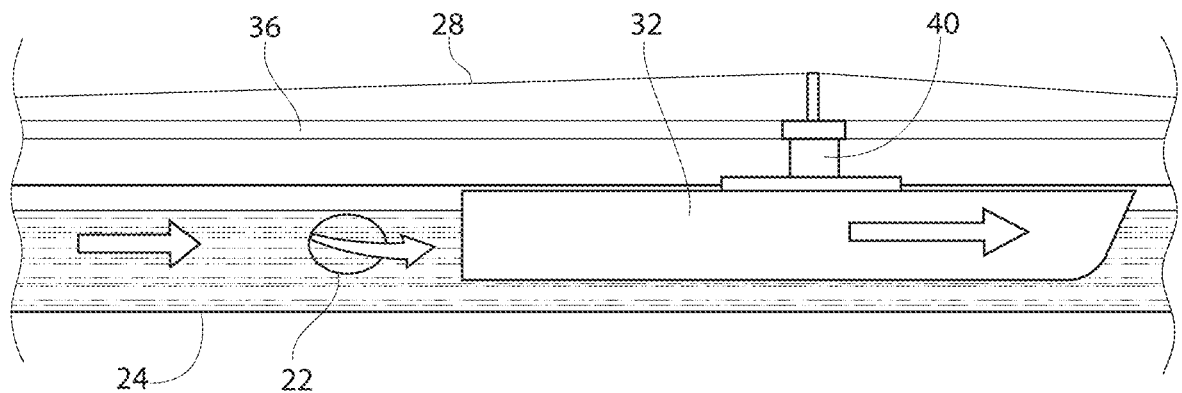
FIG. 12 is a side view of a barge in a rotor channel showing water intake.

Referring now to FIG. 12 a side view of barge 32 in rotor channel 24 showing intake channel 22 is shown. Barges 32 will experience downstream forces on the underwater part of the hull of barges 32, as well as buoyancy forces to uplift the barges 32 and allow downstream travel by barges 32 being carried by the current created in rotor channel 24. It is known that the barges 32 experience what is called calm water resistance. This is the resistance the barges 32 experience during static and travel conditions. In a static situation when the barges 32 are not moving (for instance during startup), the barges 32 are actually static, but the current moving against the vessel creates the same effect as the barges 32 moving with the speed of the current in calm water. Thus, the resistance experienced by barges 32 because of current is equivalent to the resistance which the vessel will experience in calm water when moving at the speed of the current. The calm water resistance has many components, and is a complicated calculation. Empirical methods like the Holtrop-Mennen method, and Taylor's method can be used. Particularly for barge-shaped objects, empirical methods of calculating resisting include Bureau Veritas—Towage at Sea of Vessels or Floating Units, and the Offshore Technology Conference (OTC) Paper 3320—Resistance of Offshore Barges and Required Horsepower. At any rate, the current force experienced by barges 32 can be calculated from the transverse underwater hull area, and for a roughly rectangular section shape—if the width of the barge 32 is B, and its draft is T, then the underwater transverse section area is simply B×T. The current force is finally calculated using the standard formula Current force=½×water density×(current speed)2×underwater transverse section area. Because of this, a square or rectangular barge 32 rear profile is desired, to maximize the impact of the water on the barge 32, while a more streamlined front portion of barge 32 is desired to decrease water resistance moving forward.

Figure 13:
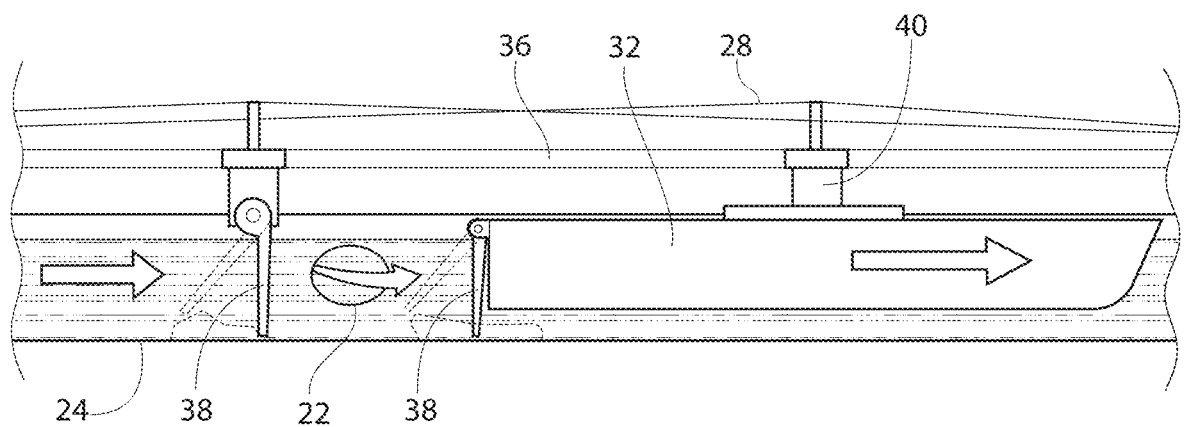
FIG. 13 is a side view of a barge in a rotor channel showing water intake, with pivoting flaps on rotating structure and on a barge.
Figure 14:
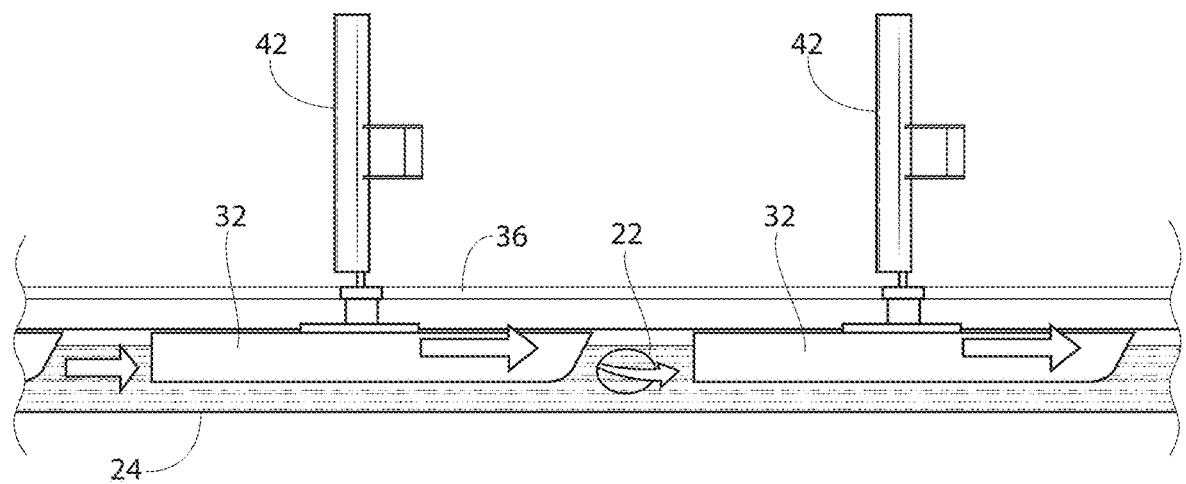
FIG. 14 is a side view of a barge in a rotor channel carrying an aerofoil.
Figure 15:
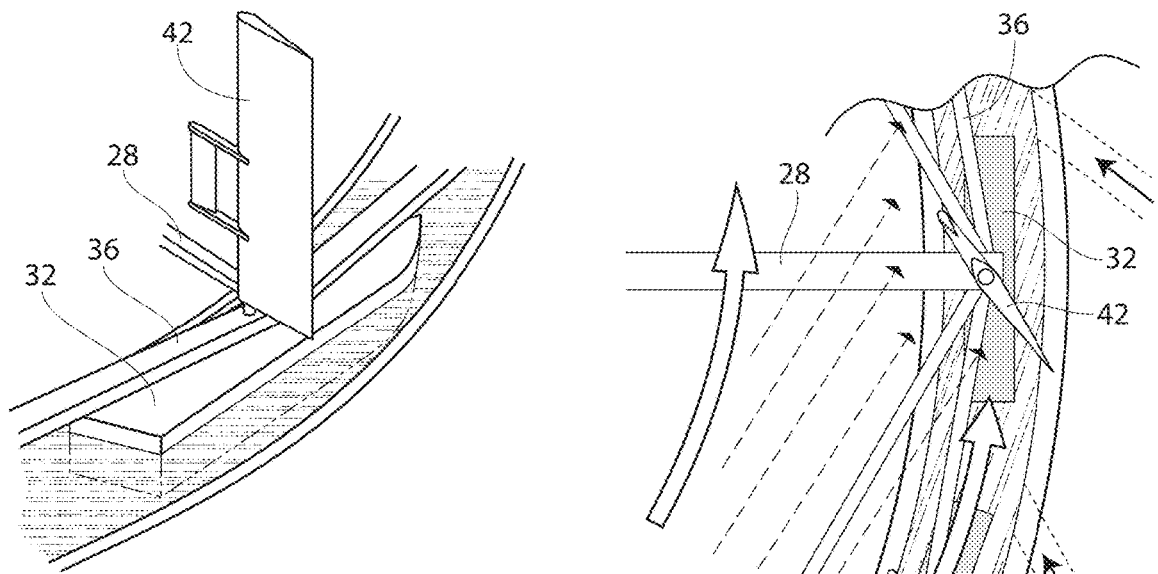
FIG. 15 is a top perspective view of a barge in a rotor channel carrying an aerofoil.

Referring now to FIG. 13, a side view of a barge 32 in rotor channel 24 is shown. In this embodiment, one or more pivoting flaps 38 can be carried by barges 32 or by the connecting struts 32. In this manner, the pivoting flaps 38 can be deployed downwardly to catch more water to encourage rotation of barges 32. Referring now to FIGS. 14 and 15, a side view and a perspective view of a barge 32 in rotor channel 24 is shown. In this embodiment, the hydroelectric generating system 10 additionally carries an aerofoil 42 for enhancing or augmenting operation of the entire hydroelectric generating system 10 by augmenting hydroelectric generation as previously described, with a large-scale vertical axis wind turbine (VAWT).

In common VAWTs, a main rotor shaft is rotated by a series of blades or aerofoils, which are carried by arms coupling the blades with the main rotor shaft. In contrast, in the present invention, due to the large-scale radius of the rotor channel, VAWT output can augment hydroelectric output. The aerofoils 42 can be carried by barges 32, carried by struts 36, or placed on a separate track above rotor channel 24 (not shown). In this manner, the carried aerofoils 42 act as a floating flywheel which can be married to turbine shaft 40 with a planetary gear (not shown). In a preferred embodiment, each aerofoil 42 can rotate about its base for optimum wind harvest.

The VAWT can comprise an arrangement as disclosed in U.S. Pat. No. 1,835,018 which is incorporated herein by reference, commonly known as a Darrieus VAWT.

Figure 16:
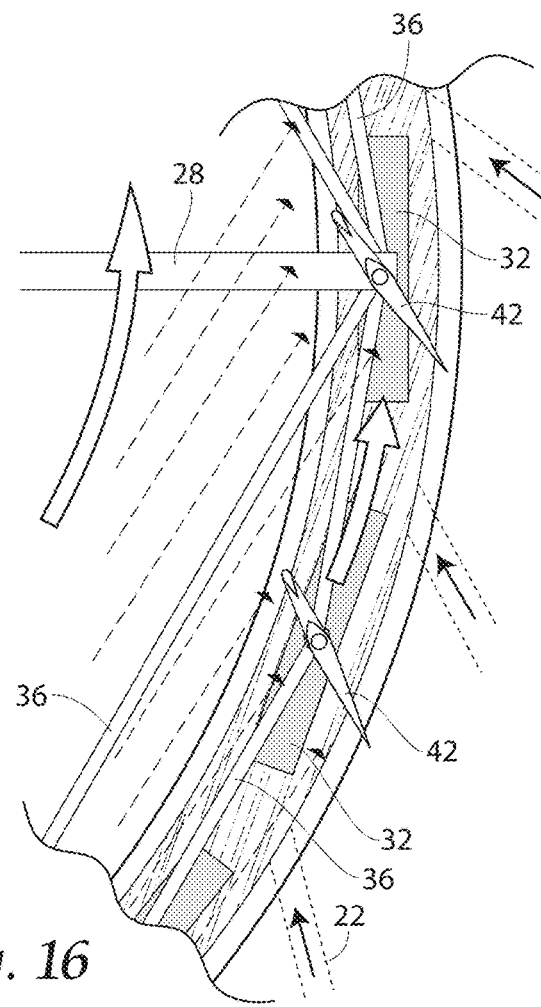
FIG. 16 is a top plan view of barges in a rotor channel carrying aerofoils, showing water and air motion impacting the high-mass rotor.

As shown in FIG. 16, in the embodiment carrying aerofoils 42, both water and air motion impact the rotation of barges 32 and thus increase energy output.

Other variations or augmentations of the present invention are possible. In addition to run-of-the-river penstock driven energy source, the hydroelectric generation system 10 can also use pump storage energy as well or pumped storage penstocks (not shown), in which a reservoir with penstocks running out of the hydroelectric generation system 10 is provided, with the water then pumped back to the reservoir to be reused, such as the Kruonis Pumped Storage Plant in Lithuania. The hydroelectric generation system 10 can also be a combination of run-of-the-river penstocks, pumped storage penstocks, as well as wind assist, or any combination of the foregoing.

Furthermore, the high-mass rotor of the present invention could, in addition to or in place of being water carried, be bearing mounted like a large turret. The high-mass rotor of the present invention could also use magnetic levitation (maglev) to suspend or assist rotation of the high-mass rotor.

Further, to assist in startup of the system, a locomotive engine or other power means could be positioned in proximity to the rotor channel 24, coupled to the system, and temporarily provide a power assist to begin rotational motion of the barges 32.

Although previously described with reference to hydroelectric generation, the system of the present invention can also be used to compress air, pump water, run a hydraulic pump, or run a generator/alternator system using known means.

Figure 17:
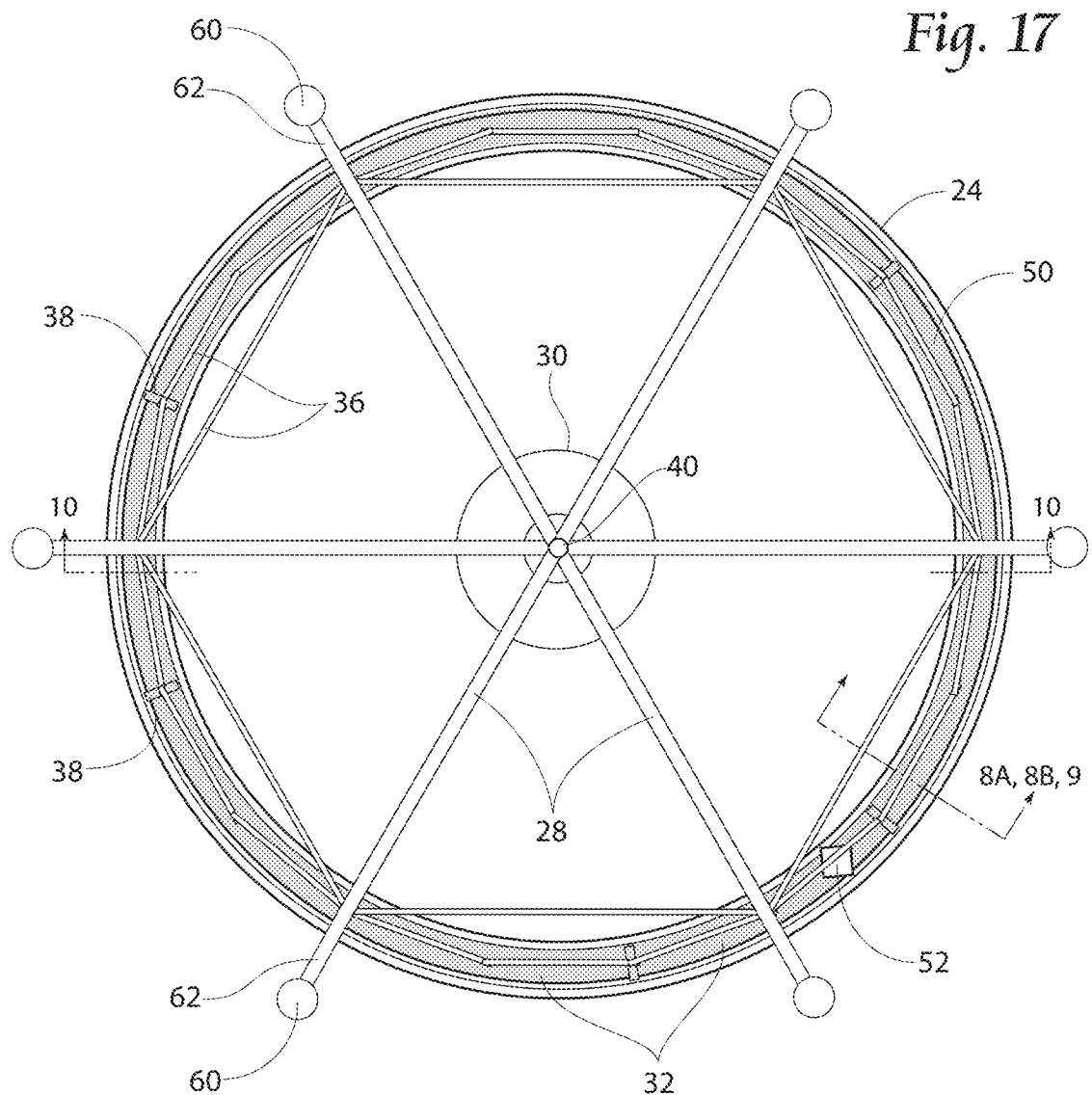
FIG. 17 is a top view of an alternate embodiment of the present invention in which a floating disc is provided to rotate in the rotor channel, optionally supporting outrigger weights.

Referring now to FIG. 17, a top view of an alternate embodiment of the present invention in which a floating disc or ring 50 is provided to rotate in the rotor channel 24, optionally supporting ring weight(s) 50 and outrigger weights 60.

The force of rotation of an object about a fixed axis, often referred to as torque, is a measure of the rotational force applied to the object. Mathematically, torque ($\tau$) is defined as the product of the force (F) applied to the object and the perpendicular distance (r) from the axis of rotation to the point where the force is applied. This can be represented by the equation: $\tau = r \times F$. When you increase the mass of the weight, F increases. When you increase the radius at which the force is applied, r increases. Since torque is directly proportional to both force and radius, increasing either or both of these factors will increase the torque. So, by increasing the radius at which the force is applied, effectively the lever arm is increased. Just like a longer wrench gives you more torque when you turn a bolt, a larger radius gives you more leverage to produce torque. So, combining these effects, having a more massive weight at a greater radius increases both the force and the lever arm, resulting in a greater torque.

For that reason, to generate more torque and thus more electricity, a ring weight 52 can be floated on either floating objects 32 as previously described, or upon floating ring 50. In a preferred embodiment, a balanced series of ring weights 52 are positioned about floating ring 50 (only one ring weight 52 is shown in FIG. 17 for simplicity sake, but more than one ring weight 52 can be used).

Figure 18:
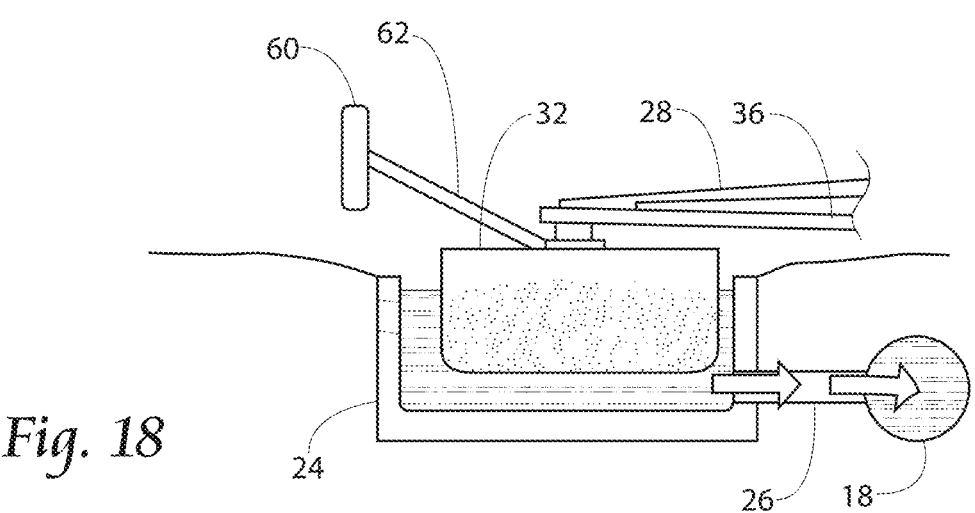
FIG. 18 is a top view of an alternate embodiment of the present invention in which a series of outrigger weights are balanced extending outwardly from the radius of the rotor channel.

Also, one or more outrigger weights 60 supported by outrigger weight support struts 62 can be used. As shown in FIG. 17, and also in cross-section in FIG. 18, these weights are placed outside the radius of the floating object (whether it be ring or discrete floating object), and preferably also extending a beneficial distance outside rotor channel 24, and have the beneficial effect of increasing both weight and radius, and thus torque. In a preferred embodiment, a series of outrigger weights 60 are balanced extending outwardly from the radius of the rotor channel 24.

Figure 19:
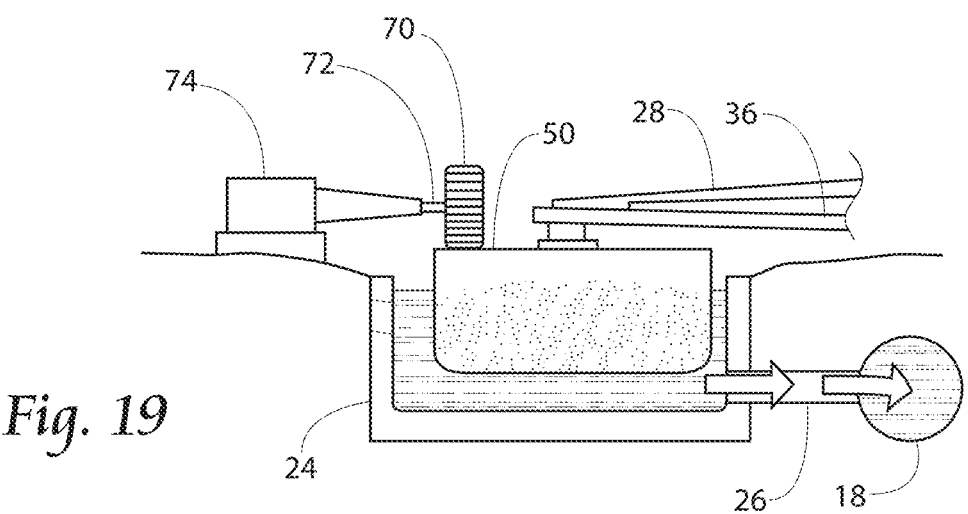
FIG. 19 is a top view of an alternate embodiment of the present invention in which a dynamo is driven by a floating, rotating body.

Referring now to FIG. 19, a top view of an alternate embodiment of the present invention in which a dynamo 74 is driven by floating rotating body 50 is shown. In this embodiment, dynamo driving wheel 70 is placed into contact with a surface of rotating body 50. Contact with a top surface of rotating body 50 is shown, although contact with any of the top, bottom, inside and outside surfaces would suffice.

Dynamo driving wheel 70 drives dynamo axle 72, inducing electrical generation through electromagnetic induction within the dynamo generator 74 as is known in the art. Inside dynamo generator 74 (not shown), a magnet and a coil of wire are provided. As the floating body 50 rotates on the water's surface during rotation, it spins the dynamo driving wheel 70, in turn driving dynamo axle 72 and a connected shaft or gear mechanism, which in turn rotates the coil within the dynamo relative to the stationary magnet (not shown). This relative motion induces a current in the coil, generating electricity. Individual dynamos 74 could be hooked up to a central electricity storage/distribution system (not shown).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A hydroelectric generation system comprising:
   a water intake to receive water from a water source, said water intake at a first elevation;
   a flow channel receiving said water from said water intake, said flow channel receiving said water at a second elevation lower than said first elevation;
   said flow channel comprising a depth and a width, said flow channel defining a pathway for flowing water to flow rotationally;
   a water discharge receiving said water from said flow channel and discharging said water from said flow channel;
   a floating body at least partially supported by said water in said flow channel, said floating body rotating about an axis, said floating body propelled by said flow of said flowing water; and said floating body driving a source of electricity generation;
   wherein said floating body carries a weight to increase a mass of said floating body; and
   wherein said floating body rotates about said axis at a first radius, and wherein said weight rotates about said axis at a second radius greater than said first radius.

2. A hydroelectric generation system according to claim 1, wherein said water source is continuously flowing.

3. A hydroelectric generation system according to claim 2, wherein said water discharge discharges said water into said continuously flowing water source.

4. A hydroelectric generation system according to claim 1, wherein said floating body is a series of spaced apart floating bodies.

5. A hydroelectric generation system according to claim 1, wherein said floating body is a floating ring.

6. A hydroelectric generation system according to claim 1, said weight supported by a strut, said strut carried by said floating body.

7. A hydroelectric generation system according to claim 1, said second radius is greater than a radius of said flow channel.

8. A hydroelectric generation system according to claim 1, said flow channel carrying said water in a circular flow path, said circular flow path rotationally horizontal.

9. A hydroelectric generation system according to claim 1, said system further comprising a driving wheel in rotational contact with said floating body, said driving wheel rotating a dynamo axle to produce electricity.

* * * * *